Sept. 23, 1969   A. G. McMILLAN   3,468,413
SHIRRED TUBULAR MATERIAL PACKAGE
Original Filed July 15, 1966
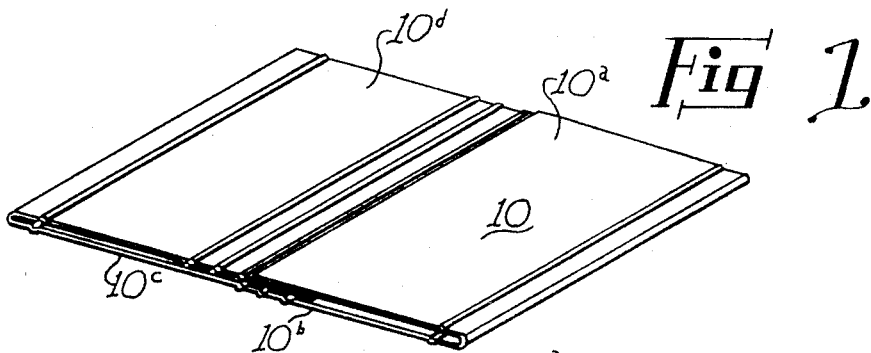
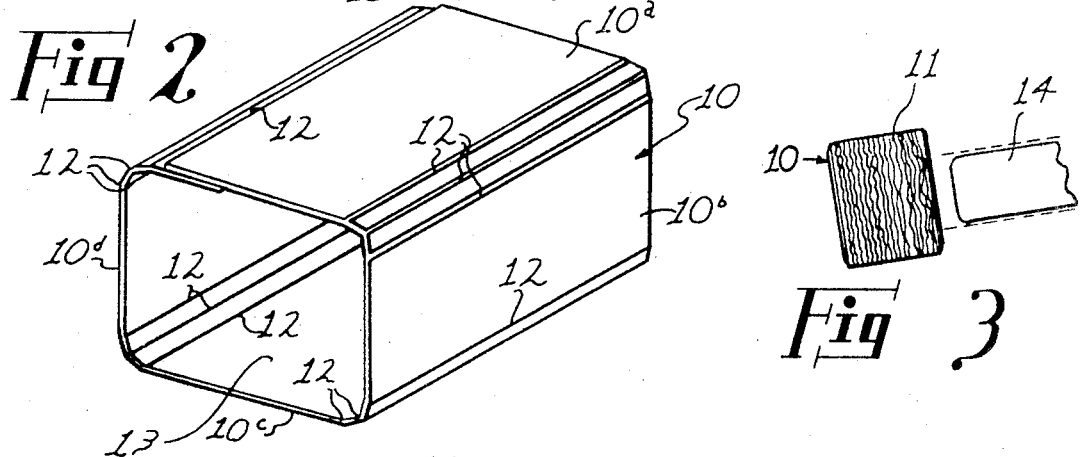
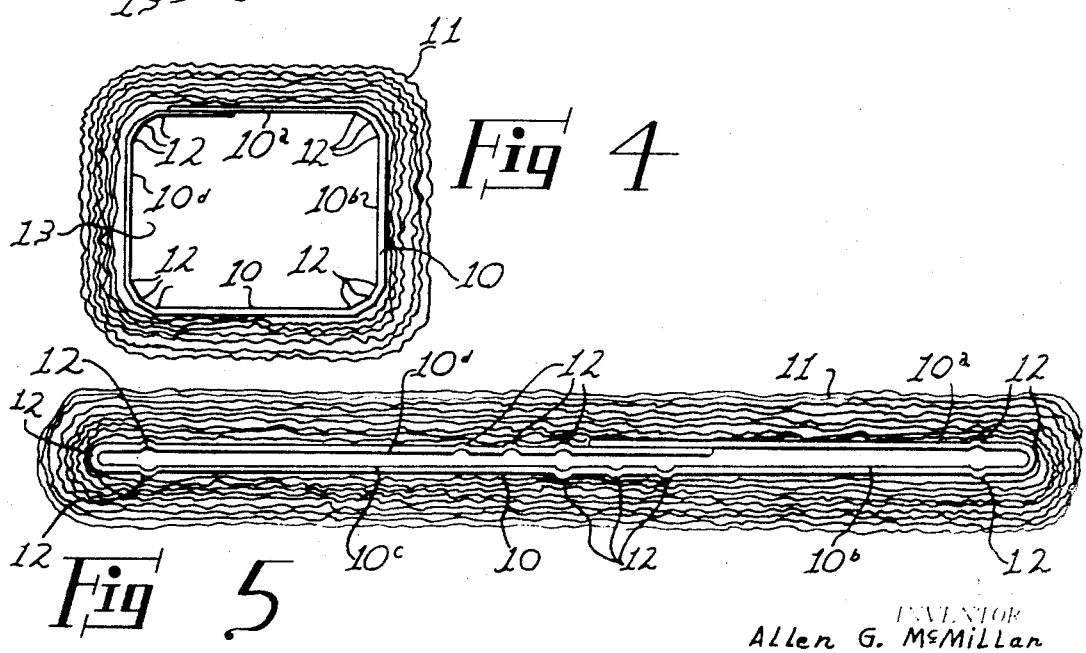
INVENTOR
Allen G. McMillan
BY
Jennings, Carter & Thompson
ATTORNEYS

United States Patent Office 3,468,413
Patented Sept. 23, 1969

3,468,413
SHIRRED TUBULAR MATERIAL PACKAGE
Allen G. McMillan, Rte. 1, Munford, Ala. 36268
Original application July 15, 1966, Ser. No. 565,625.
Divided and this application Mar. 27, 1968, Ser.
No. 716,589
Int. Cl. B65d 85/14
U.S. Cl. 206—46                    2 Claims

ABSTRACT OF THE DISCLOSURE

A package embodying a tube-like member having substantially rigid side walls connected by longitudinally extending flexible areas with a length of shirred tubular material surrounding the side walls and extending perpendicular to the flexible areas. The side walls are movable from a collapsed position to an extended position with the perimeter of the tube-like member remaining substantially constant.

CROSS REFERENCE TO RELATED APPLICATION

This is a division of application Ser. No. 565,625, filed July 15, 1966 now Patent No. 3,411,177 and entitled "Apparatus for Shirring Tubular Material and Package Therefor."

BACKGROUND OF THE INVENTION

This invention relates to a package for shirred tubular material and more particularly to a package for seamless, tubular material which is suitable for use on a horn as a covering for products, such as hams and the like.

An object of my invention is to provide a package that may be stored and shipped as a compact, collapsed mandrel with the tubular material thereon and then extended for insertion over a horn which delivers the product to be covered thus eliminating high shipping and storage cost.

As is well known in the art to which my invention relates, tubular products for use in covering or stockinetting meat products and the like have been wound on reels or made into bags for shipment from the manufacturer to the packer. Also, such tubular products have been cut and seamed into bag of selected lengths and then positioned in receptacles therefor. This procedure requires a considerable amount of time and labor due to the fact that each bag must be removed from the container and then inserted over a horn which delivers the products to be covered. That is, each bag must be pulled apart whereby an opening is provided for positioning the product over the horn.

To overcome the above and other difficulties, I provide a package for a shirred, tubular material which comprises a tube-like member movable from a collapsed, flat position for receiving a length of shirred tubular material to an extended position for insertion over a horn which delivers the product to be covered. Spaced apart, longitudinally extending flexible areas, such as scored lines, are provided on the tube-like member which facilitate movement of the tube-like member to the extended position for insertion over the horn which may be of various shapes and sizes.

A package embodying features of my invention is illustrated in the accompanying drawing, forming a part of this application, in which:

FIG. 1 is a perspective view showing the tube-like mandrel in collapsed position with the shirred tubular material being omitted for the sake of clarity;

FIG. 2 is a perspective view showing the tube-like mandrel in extended position with the shirred tubular material being omitted for the sake of clarity;

FIG. 3 is a side elevational view, drawn to a smaller scale, showing the shirred tubular material on the mandrel with the mandrel extended and in position to be inserted over a horn;

FIG. 4 is an end elevational view showing the tube-like mandrel expanded with the tubular material thereon; and, FIG. 5 is an enlarged and elevational view showing the tube-like mandrel collapsed with the tubular material thereon.

Referring now to the drawings for a better understanding of my invention, I show a tube-like mandrel 10 which is adapted to move from a collapsed, flat position, as shown in FIGS. 1 and 5, to an extended position, as shown in FIGS. 2. and 4. While in the collapsed, flat position opposite sides of the mandrel 10 extend parallel to each other for receiving the tubular material 11 as shown in FIG. 5. The mandrel 10 comprises substantially rigid side walls 10a, 10b, 10c and 10d whereby the mandrel is movable to the collapsed, flat position with side walls 10a and 10d lying in a common plane and side walls 10b and 10c lying in a common plane. By providing substantially rigid side walls, the mandrel 10 maintains the generally flat shape when moved to the positions shown in FIGS. 1 and 5 and also maintains the general shape of the extended mandrel shown in FIGS. 2 and 4. Accordingly, the outer perimeter of the mandrel remains the same as the mandrel is moved from collapsed position to extended position thus facilitating insertion of the mandrel over a horn. As shown in FIGS. 1, 2, 4 and 5, spaced apart longitudinally extending flexible areas in the form of scored lines 12 are provided on the tube-like mandrel so that the mandrel may be readily moved from the collapsed position to the extended position shown in FIGS. 2, 3 and 4. Preferably, three adjacent scored lines are provided at intervals at the corners of the tube-like member 10 as shown, whereby upon moving the member 10 to extended position, as shown in FIGS. 2, 3 and 4, an opening 13 is provided. While I have shown the mandrel 10 as having four side walls, it will be apparent that the size and number of side walls may be varied to accommodate horns 14 of various sizes and shapes. That is, I provide the proper number of side walls of the desired size to fit the horn on which the the mandrel is used.

From the foregoing description, the operation and use of my improved package will be readily understood. The tubular material 11 is gathered or shirred longitudinally and positioned on the mandrel 10 with the mandrel in the collapsed position as shown in FIGS. 1 and 5. The material 11 surrounds the mandrel and extends generally perpendicular to the longitudinally extending flexible areas. After a predetermined length of the tubular material 11 has been delivered onto the mandrel 10, the material is severed whereupon the package is then ready for delivering the material to a horn 14 or the package may be stored or shipped while in the collapsed position. The horn 14 may be a conventional type well known in the art which delivers the products, such as hams and the like to be covered with the tubular material 11. The relatively rigid side walls of the mandrel 10 prevent distortion thereof between the flexible areas at the corners whereby the mandrel is adapted to retain either the collapsed position or the extended position. Accordingly, the package consisting of the mandrel 10 and the shirred tubular material thereon is easily stored and shipped without losing its relatively flat shape. On the other hand, upon moving the side walls of the mandrel 10 to extended position the side walls remain in spaced relation to each other to define the opening 13 for receiving the horn 14, thus facilitating insertion of the mandrel over the horn.

From the foregoing it will be seen that I have devised an improved package consisting of a collapsible and extendable mandrel and a tubular material. By placing the shirred material 11 on the collapsed mandrel 10, I provide a finished package which is relatively flat and requires a minimum of space for storage and shipping. Also, by providing the scored lines 12 longitudinally of the mandrel 10 and at spaced intervals, the tubular mandrel 10 may be readily moved to extended position, as shown in FIGS. 2, 3 and 4 whereby the mandrel may be positioned over a horn 14 which delivers the product to be covered. The mandrel 10 may remain on the horn 14 or the gathered material 11 may be forced off the mandrel onto the horn 14 whereby the material is then employed to cover a product in a continuous operation without intermittently bagging each item. In accordance with my invention I provide for a quick assembly of hundreds of feet of shirred tubular material over a horn in a matter of seconds rather than requiring the operation to stop while each individual tubular member or bag is inserted over the horn.

While I have shown my invention in but one form, it will be obvious to those skilled in the art that it is not so limited, but is susceptible of various other changes and modifications without departing from the spirit thereof.

What I claim is:

1. A shirred tubular material package adapted for insertion over a horn which delivers a product to be covered, (a) a tube-like member having a plurality of substantially rigid side walls connected to each other by flexible areas extending longitudinally between adjacent side walls, (b) a length of shirred tubular material surrounding said side walls generally perpendicular to said longitudinally extending flexible areas, (c) said tube-like member being movable with said shirred tubular material thereon from a collapsed flat position to an extended position for insertion over a horn which delivers the product to be covered, with the outer perimeter of said tube-like member remaining substantially constant as the tube-like member is moved from collapsed position to extended position.

2. A shirred tubular material package as defined in claim 1 in which said flexible areas extending longitudinally between adjacent side walls comprise longitudinally extending scored lines on said tube-like member.

References Cited

UNITED STATES PATENTS

| 347,416 | 8/1886 | Buckingham | 229—93 |
| 3,148,991 | 9/1964 | Svendsen | 99—175 |

WILLIAM T. DIXSON, JR., Primary Examiner

U.S. Cl. X.R.

99—175